United States Patent [19]

Sano

[11] Patent Number: 5,682,603
[45] Date of Patent: Oct. 28, 1997

[54] START-UP METHOD FOR MOBILE TRANSCEIVERS, MOBILE TRANSCEIVERS AND FIXED TRANSCEIVERS THEREOF

[75] Inventor: Mitsuhiro Sano, Oobu, Japan

[73] Assignee: Nippondenso Co., Ltd., Kariya, Japan

[21] Appl. No.: 504,119

[22] Filed: Jul. 19, 1995

[30] Foreign Application Priority Data

Jul. 20, 1994 [JP] Japan ................... 6-168196

[51] Int. Cl.$^6$ ................... H04Q 7/18
[52] U.S. Cl. ................... 455/38.2; 455/343; 340/825.54; 342/50; 342/51
[58] Field of Search ................... 455/38.2, 38.3, 455/54.1, 67.3, 226.2, 226.3, 226.4, 227, 229, 352, 353; 340/825.54, 825.34, 825.69, 825.72, 825.57; 370/311; 342/42, 44, 47, 48, 51, 50

[56] References Cited

U.S. PATENT DOCUMENTS

| | | | |
|---|---|---|---|
| 4,303,904 | 12/1981 | Chasek | 340/23 |
| 4,481,675 | 11/1984 | Ichikawa et al. | 455/343 |
| 5,086,389 | 2/1992 | Hassett et al. | 364/401 |
| 5,144,553 | 9/1992 | Hassett et al. | 364/401 |
| 5,193,212 | 3/1993 | Son | 455/38.3 |
| 5,225,667 | 7/1993 | Furuta et al. | 235/492 |
| 5,444,742 | 8/1995 | Grabow et al. | 375/267 |
| 5,471,212 | 11/1995 | Sharpe et al. | 342/51 |
| 5,479,172 | 12/1995 | Smith et al. | 342/51 |
| 5,487,177 | 1/1996 | Lunter | 455/67.3 |
| 5,533,058 | 7/1996 | Kady et al. | 375/317 |

FOREIGN PATENT DOCUMENTS

| | | |
|---|---|---|
| 361350 | 4/1990 | European Pat. Off. |
| 401192 | 12/1990 | European Pat. Off. |
| 585718 | 3/1994 | European Pat. Off. |
| 590252 | 4/1994 | European Pat. Off. |
| 351785 | 3/1991 | Japan |
| 5273338 | 10/1993 | Japan |
| 644488 | 2/1994 | Japan |
| 6300837 | 10/1994 | Japan |
| 2251362 | 7/1992 | United Kingdom |
| 9009707 | 8/1990 | WIPO |

*Primary Examiner*—Reinhard J. Eisenzopf
*Assistant Examiner*—Lee Nguyen
*Attorney, Agent, or Firm*—Cushman, Darby & Cushman IP Group of Pillsbury Madison & Sutro LLP

[57] ABSTRACT

To provide a communications system to accurately detect when a mobile transceiver has entered an area where communication with a fixed transceiver is possible, and to start-up the internal circuitry of the mobile transceiver, a communications system transmits a start-up pilot signal of a prescribed period from a transponder mounted in a fixed station to a transponder mounted in a vehicle. In the transponder, the received signal upon being received by an antenna is detected in a detector and amplified in an amplifier. When this signal is greater than a reference voltage, a pulse is output from a level discriminator. This pulse signal is converted into a pulse of constant pulse width in a discriminator pulse generator and integrated in an integrator. When the integrated value exceeds a reference voltage, a start-up discriminator sends a drive signal to actuate the internal circuitry of the mobile transceiver. As a consequence, mistaken start-up of the internal circuitry due to noise input is prevented and the internal circuitry is started only when necessary.

17 Claims, 5 Drawing Sheets

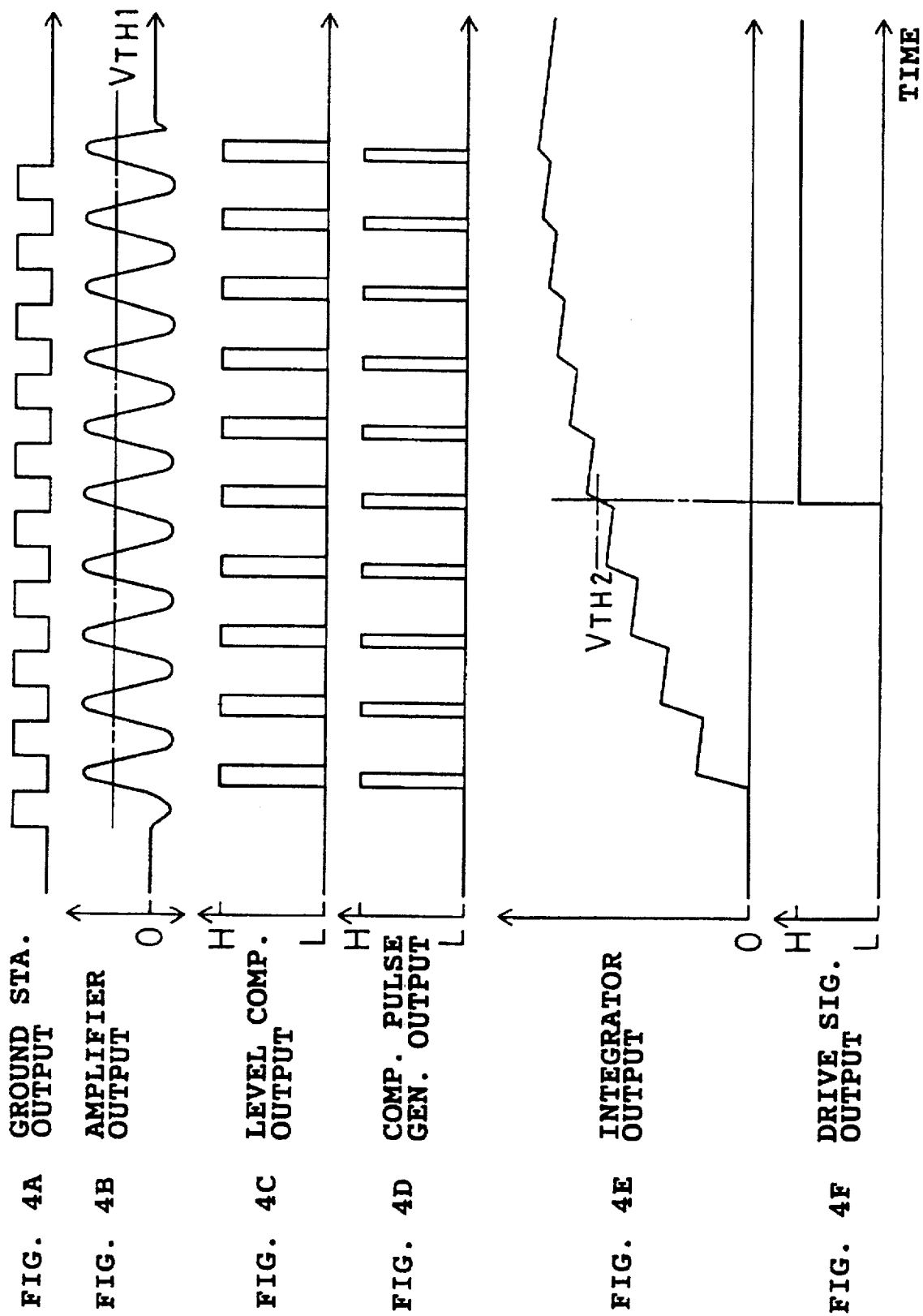

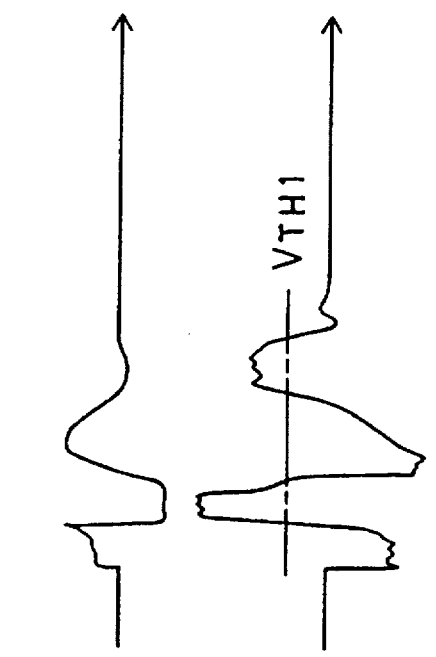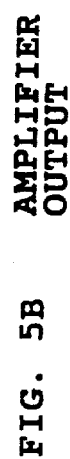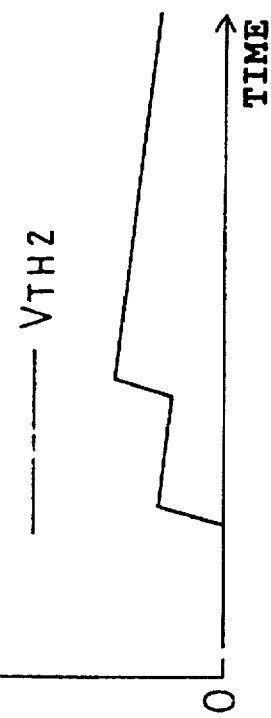
FIG. 5A  AMPLIFIER INTERNAL SIG.
FIG. 5B  AMPLIFIER OUTPUT
FIG. 5C  LEVEL COMP. OUTPUT
FIG. 5D  COMP. PULSE GEN. OUTPUT
FIG. 5E  INTEGRATOR OUTPUT

START-UP METHOD FOR MOBILE TRANSCEIVERS, MOBILE TRANSCEIVERS AND FIXED TRANSCEIVERS THEREOF

CROSS-REFERENCE TO RELATED APPLICATIONS

This application is related to and claims priority from Japanese Patent Application No. Hei. 6-168196, incorporated herein by reference.

BACKGROUND OF THE INVENTION

1. Field of the Invention

This invention relates to a mobile transceiver start-up method and communication equipment to achieve this method to automatically start-up a mobile transceiver performing prescribed communication operations with a fixed transceiver installed at a ground location, when the mobile transceiver enters an area where communication with the fixed transceiver is possible.

2. Description of Related Art

It is known that conventionally, one function provided in portable or vehicular mobile transceivers to conserve electrical power is a wakeup function to automatically start up the internal circuitry of the transceiver when a prescribed signal is received from a fixed transceiver (hereafter referred to as a ground station) installed at a ground location upon determining that the mobile transceiver has entered an area where communication with the fixed transceiver is possible.

The mobile transceiver, in order to determine whether it has entered an area where communication with a fixed station is possible, receives a transmit signal from the ground station via a communication antenna, detects and amplifies this signal and determines whether the level of the amplified signal exceeds a prescribed level.

In other words, in the conventional method, the mobile transceiver receives a signal transmitted from the ground station and if it determines that the received signal exceeds a prescribed level, then the mobile transceiver is determined to have entered an area where communication is possible with the fixed station and the internal circuitry is started.

However, this kind of start-up method has a problem in that although the circuit structure has been simplified, and is able to curb electrical power consumption, only one comparator is used for level discrimination. Thus, when external noise is input via the antenna or the receive circuit input circuit path from the antenna to the comparator, this noise may be mistaken by the comparator for a received signal exceeding a prescribed level, thereby causing unnecessary start-up of the transceiver circuitry.

In other words, although conventional start-up methods have succeeded in simplifying receive level circuitry and achieved a reduction in electrical power consumption, noise causes an unintended start-up of the transceiver circuitry with the result that reduction of electrical power consumption of the mobile transceiver equipment is inadequate.

These mistaken start-ups of the internal circuitry are prone to occur frequently in environments with much noise (such as in automobiles) so that even if this conventional start-up method is adopted for use in mobile transceivers installed in automobiles, a satisfactory wakeup function is not obtained.

SUMMARY OF THE INVENTION

In consideration of these problems, this invention has an object of providing a wakeup function for automatic start-up of mobile transceivers entering an area where communication with a ground station is possible by accurately detecting the mobile transceiver penetration into the communication area without being affected by noise and starting up the internal circuitry of the transceiver with high efficiency.

To achieve the above object, a first aspect of the present invention provides a start method to start a mobile transceiver upon entering an area where communication is possible with a fixed transceiver, for the purpose of performing communications with the fixed transceiver where a start-up signal of a prescribed time interval is sent periodically from the fixed transceiver, and the signal received from the antenna is detected and amplified in the mobile transceiver and then compared with a reference value of a prescribed level to allow discrimination, a pulse signal is generated with a pulse width corresponding to the level of the received signal, the pulse signal is converted into a start discriminator pulse signal of fixed pulse width and integrated, and when the integrated value exceeds a prescribed reference start-up value, the mobile transceiver is determined to have entered an area where communication is possible with the fixed transceiver and the internal circuitry of the mobile transceiver is started.

In this kind of level discrimination method, although a pulse signal is generated when the start signal received by the mobile transceiver from the fixed transceiver exceeds a prescribed receive level, pulses may also be generated when a large amount of external noise is superimposed on the receive signal and the resultant level is high. Consequently, a method according to this invention, therefore, accepts the pulse generated by the above mentioned level discrimination and converts the pulse into a start discrimination pulse signal. This pulse signal is then integrated and when the integrated value exceeds a prescribed start discrimination reference level, the mobile transceiver is determined to have entered an area where communication with the fixed transceiver is possible and the internal circuitry is started.

In other words, unlike the start signal sent from the fixed transceiver, noise cannot change periodically for each specific amount of time. However large the noise level might be, there will be no periodically repeating pulse signal generated by the above level discrimination. In this invention the generated pulse signal is converted into a pulse signal of fixed pulse width by means of the above level discrimination, this pulse signal is integrated and an integrated value exceeding the prescribed level results only when a pulse signal exceeding the prescribed period and prescribed quantity is repetitively generated (in other words, only at times when the mobile transceiver receives a start signal from the fixed transceiver). The integrated value which is larger than the start discriminator reference value determines that the mobile transceiver has entered an area where communication with the fixed transceiver is possible and the internal circuitry is started.

Therefore, in a method according to this invention the circuitry can be reliably started exclusively when the mobile transceiver has entered an area where communication with the fixed transceiver is possible. Moreover, mistaken circuit start-ups of the mobile transceiver due to external noise are prevented. This method also allows an extremely satisfactory reduction in electrical power consumption. Even when the fixed transceiver is installed in locations subject to much external noise, such as automobiles, a reduction in electrical power consumption can be obtained.

A second aspect of the present invention provides a fixed transceiver having a communication antenna and a communication section for performing prescribed communication with a mobile transceiver by means of the antenna, where the communication section is provided with a start-up signal sending section for sending start-up signals at predetermined intervals through the antenna.

According to a further aspect of the present invention, a mobile transceiver includes a communication antenna, a communication section for communicating with a fixed transceiver by way of the antenna, and a start-up section which determines when the mobile transceiver has entered an area where communication is possible with the fixed transceiver based on a start signal transmitted from the fixed transceiver, where the start-up section includes a signal processing section for detecting and amplifying the signal received signal from the antenna, a level discriminator for comparing the detected and amplified signal with a reference value of a prescribed level to allow discrimination and for generating a pulse signal with a pulse width corresponding to the level of the received signal, a pulse generating section for converting the pulse signal formed in the level discriminator section into a start pulse signal of a fixed pulse width, an integrating section for integration of the pulse signal output from the pulse generating section, and a start discrimination section for starting the communication section which determines the mobile transceiver has entered an area where communication is possible with the fixed transceiver, when comparison by the above integrating section shows the integrated value is greater than the prescribed level of the reference value.

The mobile transceiver may be provided with a communication antenna, a communication section for prescribed communication with a fixed transceiver by way of the antenna, and a start-up section for starting the above communication section upon determining that the mobile transceiver has entered an area where communication is possible with the fixed transceiver based on a start signal transmitted from the fixed transceiver.

In this start-up section, first a signal processing section detects and amplifies the signal received from the antenna, next a level discriminator section compares the detected and amplified signal with a reference value of a prescribed level to determine which is greater and generates a pulse signal with a pulse width corresponding to the level of the received signal, a pulse generating section converts the pulse signal formed in the level discriminator section, into a start pulse signal of a fixed width, an integrating section integrates the pulse signal output from the pulse generating section, finally a start discrimination for starting the communication section which compares the integrated value integrated by the integration section with the prescribed reference value for start discrimination, and when the integrated value exceeds the start discrimination reference value, the discrimination section determines that the mobile transceiver has entered the area where communication is possible with the fixed transceiver, and starts the communication section.

As a result, the mobile transceiver start-up method can be implemented using the above fixed transceiver and the above mobile transceiver. These methods and devices allow accurate start-up of the mobile transceiver only when the mobile transceiver has entered an area where communication is possible with the fixed transceiver without being affected by noise.

In the fixed transceiver a communication section for performing prescribed communication with a mobile transceiver may be provided with a start-up signal sending section for sending start-up signals at predetermined intervals by way of an antenna.

According to another aspect of the invention, the mobile transceiver is a vehicular transceiver mounted in a vehicle. In the communication section here, a self-identifying code is first sent by means of the antenna to the fixed transceiver and afterwards prescribed processing performed according to the transmit signal from the fixed transceiver. In other words, upon nearing the fixed transceiver, the mobile transceiver of this invention transmits a self-identifying code to the fixed transceiver. The transmit signal from the mobile transceiver serves to announce its proximity to the fixed transceiver and the mobile transceiver then functions as a transponder, complying with instructions sent from the fixed transceiver.

Also, it is possible that the device is installed on the roadway along which the vehicle runs and that the above mentioned communication section, when a self-identifying code is received from the mobile transceiver installed in the vehicle running along the same roadway, a prescribed command signal is sent by the fixed transceiver to the mobile transceiver.

The fixed transceiver may be installed along the roadway used by the vehicle. In this communication section, when a self-identifying code is received from the mobile transceiver mounted in a vehicle moving along the roadway, a prescribed command signal is sent to the mobile transceiver. In other words, the fixed communication section of this invention functions as monitoring or command equipment with respect to the mobile transceiver mounted in a vehicle.

The mobile transceiver and fixed transceiver can be applied, for example, to transport systems using autonomous vehicles at factories, dispatch facilities, pay systems monitoring the coming and going of vehicles on toll roads and pay parking lots and levying a toll fee or parking fee on vehicles, etc. These kinds of systems will also benefit from the invention since it provides a mobile transceiver not susceptible to noise while mounted in a vehicle and which is able to restrain electrical power consumption to a minimum because the circuitry is only started up when the vehicle is in proximity to the fixed transceiver.

Since the mobile transceiver starts up and sends the self-identifying code only when in proximity to the fixed transceiver, the self-identifying code is prevented from being sent in spite of the vehicle being far apart from the fixed transceiver thus preventing other devices from being mistakenly operated by a mistaken transmission..

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A–4F are timing charts illustrating the operation in the start discriminator when a pilot signal is received from the ground station in the embodiment; and FIGS. 5A–5E are timing charts illustrating the operation of the system when external noise is input in the start discriminator of the embodiment.

DETAILED DESCRIPTION OF THE PRESENTLY PREFERRED EXEMPLARY EMBODIMENTS

The preferred embodiments of the present invention are hereinafter described with reference to the accompanying drawings.

Figure 2:
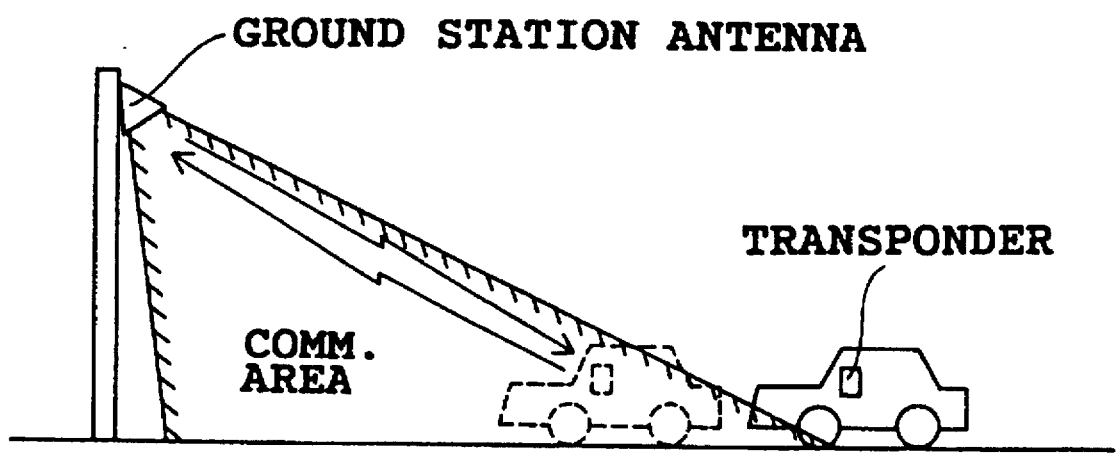
FIG. 2 is an explanatory drawing of the overall concept of the collection systems for toll roads of the embodiment.
Figure 3A:
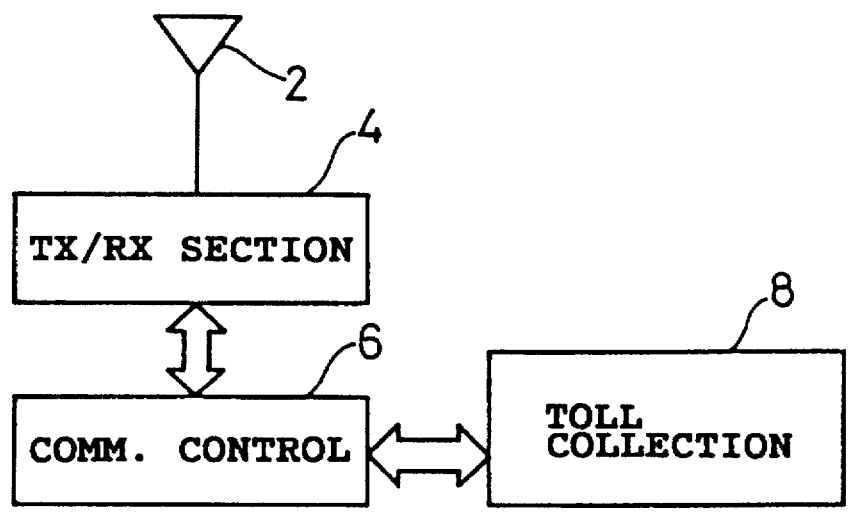
FIGS. 3A and 3B are block diagram showing the composition of the ground station of the collection systems for toll roads and the transponder of the embodiment.
Figure 3B:
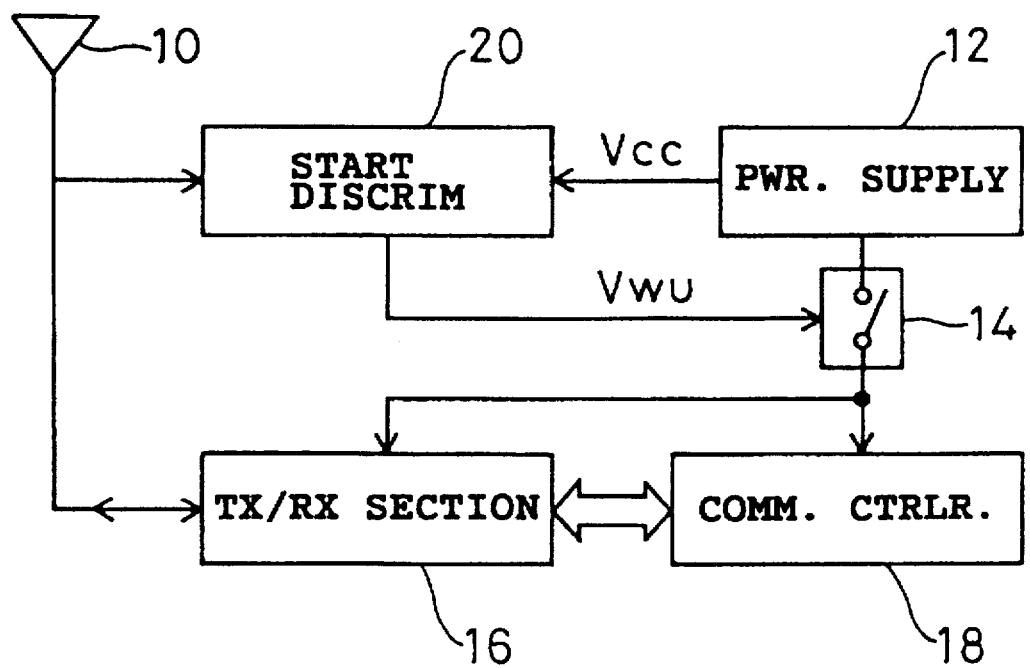

FIG. 2 is a schematic drawing of a toll road collection system suitable as an embodiment to which the present invention is applied. FIGS. 3A and 3B are block diagram of the toll road collection system showing the transponder function of a mobile transceiver for communicating with the ground station upon approaching the fixed transceiver which functions as the ground station.

As shown in FIG. 2, the toll collection system of this embodiment utilizes ten pilot signals sent periodically from a ground station antenna installed at the entrance and exit of the toll road to start up a transponder installed in the vehicle. The transponder of the vehicle is automatically started when the vehicle has entered an area where communication with the ground station is possible. After start-up and upon instructions from the ground station, for instance when the vehicle enters a toll roadway, the name of the interchange will be stored in the transponder, and when the vehicle leaves the toll roadway, the transponder is made to send the name of the interchange where the toll roadway was entered, and prescribed communication necessary for billing is performed.

As shown in FIG. 3A, in order to perform this communication, the ground station is provided with an antenna 2, a data transmit-receive section 4 for data communication using the communication antenna 2 with the transponder installed in the vehicle, and a communication control section 6 for controlling the data transmit-receive section 4 and transmission/reception of prescribed data for road toll charges. The communication control section 6 is connected to a toll collection device 8 for issuing a bill, etc., according to data obtained by communication with the transponder.

As shown in FIG. 3B the transponder mounted in the vehicle is provided with a communication antenna 10, a start discriminator 20 which is always in operation and is directly supplied with power from the power supply 12 which generates a uniform power supply voltage $V_{CC}$ using power supplied from a vehicle-mounted battery by way of power supply switch 14, a data transmit-receive section 16 for performing data communication with the ground station by way of antenna 10 while receiving power from the power supply 12 by way of the power supply switch 14, a communication controller 18 to control the data transmit-receive section 16 for transmission and reception of prescribed data while receiving power from the power supply 12, and to determine whether the vehicle (in other words, the transponder) has entered an area where data communication is possible with the ground station based on the signal received from antenna 10 and if within the area, power supply switch 14 is turned on, and data transmit-receive section 16 and communication controller 18 are started.

Communication control section 6 and communication controller 18 installed in the ground station and transponder, respectively, each include a one-chip microprocessor which may include a CPU, ROM and RAM, etc. Communication control section 6 of the ground station not only performs data communication with the transponder but also causes the data transmit-receive section 4 to transmit through the antenna 2 a signal corresponding to a pulse signal by outputting a burst of a signal having a predetermined frequency (10 kHz in this embodiment) at certain time intervals (every 10 msec. in this embodiment) for a certain duration (1 msec. in this embodiment) to the transponder. In other words, the antenna 2 of the ground station broadcasts a total of 10 pulses every 10 msec. for a 1 msec. duration at intervals of 0.05 msec. by means of operation of communication control section 6.

This transmission wave is a pilot signal (in other words, a start signal) for starting the internal circuitry (in other words, data transmit-receive section 16 and communication controller 18) of the transponder. A signal is also sent and received between the ground station and transponder for data communication. This signal is synchronized with a 100 kHz transmit clock and modulated with serial data so the speed is higher than that of the pilot signal.

In the transponder, the start discriminator 20 receives the pilot signal sent by the ground station as described above, and when the transponder determines an area has been entered where communication is possible with the ground station, the transponder turns on power supply switch 14 and supplies power supply voltage $V_{CC}$ to the communication controller 18 and the data transmit-receive section 16 for their operation.

Below are explained, based on FIG. 1, the structure of start discriminator 20 for controlling in the transponder on and off operation of power supply switch 14, and the start and stop of the communication controller 18 and the data transmit-receive section 16.

Figure 1:
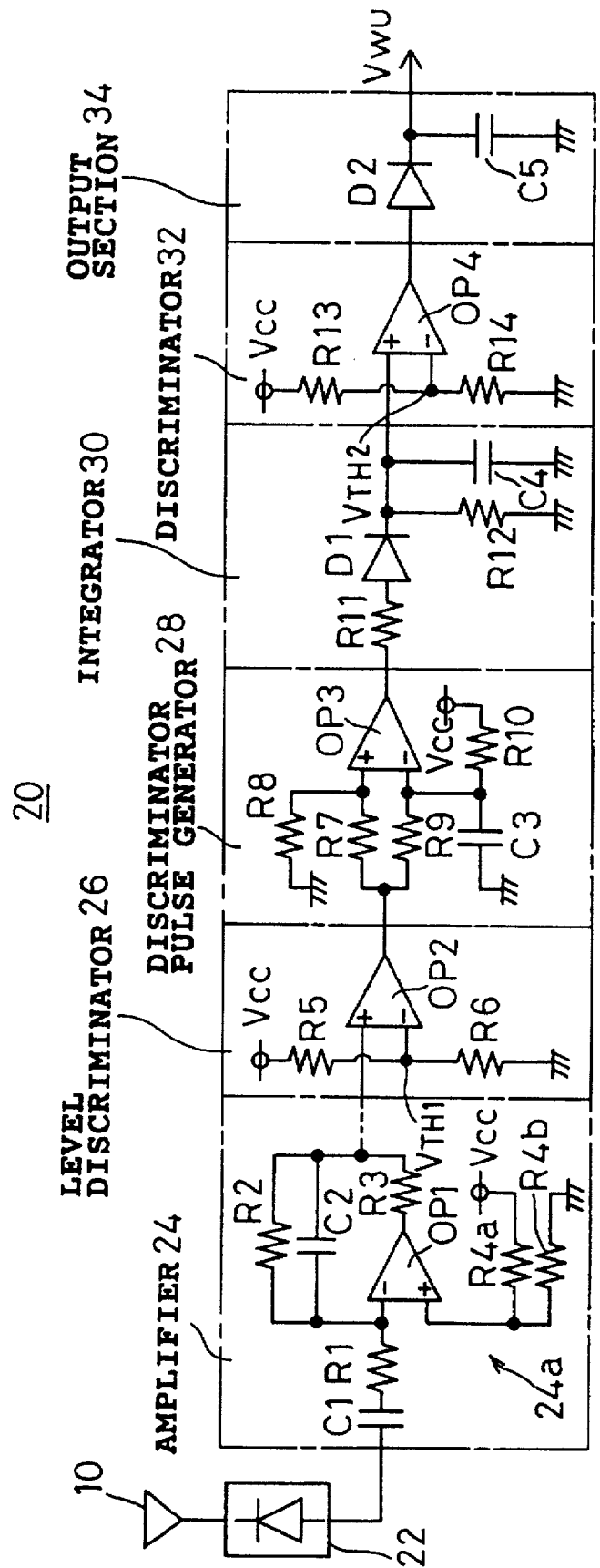
FIG. 1 is an electrical circuit schematic showing the structure of the start discriminator for the transponder of a preferred embodiment.

As shown in FIG. 1, the start discriminator 20 includes a detector 22 for detecting the signal received from the antenna 10, an amplifier 24 for amplifying the signal after detection in the detector 22, a level discriminator 26 for comparing the amplified signal from amplifier 24 with a reference voltage $V_{TH1}$ for level discrimination and when the received signal exceeds the reference voltage $V_{TH1}$, sending a high level signal to discriminator pulse generator 28 for generating a high level pulse for a specific time (in other words, a pulse of a constant pulse width) after the rise of the pulse signal output from the level discriminator 26, an integrator 30 for integrating the pulse signal of constant pulse width output from the discriminator pulse generator 28, a start-up discriminator 32 determining that the transponder has entered an area where communication with the ground station is possible when the integrated value exceeds a reference voltage $V_{TH2}$, and thereupon sending a high level drive signal to turn on the power supply switch 14, and an output section 34 for driving the power supply switch 14 and continuing to drive power supply switch 14 for a specified time even after the fall of the drive signal pulse from the start-up discriminator 32.

Here, the amplifier 24 includes an inverting amplifier circuit in three stages including an operational amplifier OP1 shown in FIG. 1. The inverting amplifier circuits are comprised of a capacitor C1 and resistor R1 to input the received signal to the inverting input of the operational amplifier OP1; a voltage divider formed by resistors R4a and R4b to apply a specific voltage portion of the power supply voltage $V_{CC}$ to the non-inverting input terminal of operational amplifier OP1, an output resistor R3 connected to the output terminal of the operational amplifier OP1, and a feedback resistor R2 and a capacitor C2 having respective ends connected to the output terminal of resistor R3 and the inverting input terminal of operational amplifier OP1 to form an amplifier circuit which inverts, amplifies and outputs a high frequency signal in the vicinity of a frequency band (approx. 10 kHz in this embodiment) which corresponds to the pilot signal from among the received signals input after being detected by the detector 22.

The level discriminator 26 for performing level discrimination of the received signal amplified by the three stage inverting amplifier circuit of amplifier 24, includes a comparator comprising an operational amplifier OP2 and voltage divider resistors R5 and R6 applying a reference voltage $V_{TH1}$ as a portion of the power supply voltage $V_{CC}$ to the inverting input terminals of operational amplifier OP2. The received signal from amplifier 24 is sent to the non-inverting input terminal of operational amplifier OP2. When the received signal here exceeds the reference voltage $V_{TH1}$, a high level pulse signal is output, and when the received signal here is smaller than the reference voltage $V_{TH1}$, a low level pulse signal is output.

Next, the discriminator pulse generator 28 includes an operational amplifier OP3, resistors R7 and R9 for respective input of the output pulse from the level discriminator 26 to the inverting and non-inverting input terminals of operational amplifier OP3, a grounding resistor R8 for grounding the non-inverting input terminal of operational amplifier OP3, a resistor R10 for applying power supply voltage $V_{CC}$ to the inverting terminal of operational amplifier OP3, and a capacitor C3 with one end connected to the inverting terminal of operational amplifier OP3 and the other end connected to ground.

In the discriminator pulse generator 28, when the output from the level discriminator 26 is stable, the input terminals of the operational amplifier OP3 are at the same level and no signal is sent from the operational amplifier OP3. However if the level discriminator 26 output changes from low to high (in other words, at pulse signal rise time) then the level at the inverting input terminals of operational amplifier OP3 grounded by way of the capacitor C3 will be a temporarily low level compared to the non-inverting input terminal level only for the time required for the capacitor C3 to charge, so consequently the output of operational amplifier OP3 will set to a high level only for a fixed period of time due to the difference in input levels. However, if the level discriminator 26 output changes from high to low (in other words, at pulse signal fall time) then the level at the inverting input terminals of operational amplifier OP3 grounded by way of the capacitor C3 will be at a temporarily high level compared to the non-inverting input terminal level, so the output at OP3 will stay unchanged at a low level and no signal will be output from operational amplifier OP3.

Accordingly, after an output pulse rise from the level discriminator 26, the signal level (pulse signal) from the discriminator pulse generator 28 is high for only a fixed amount of time. The output time for this pulse signal (in other words, pulse width) is determined by the time constant set by the fixed value of resistor R9 and capacitance of the capacitor C3.

An integrator 30 which receives the pulse signal from the discriminator pulse generator 28 includes a resistor R11 with one end connected to the output terminal of the discriminator pulse generator 28, a diode D1 to prevent reverse flow back to the discriminator pulse generator 28 with its anode connected to the other end of the resistor R11, and a grounding resistor R12 having one end connected to the cathode of diode D1, and a charging capacitor C4 connected in parallel with the grounding resistor R12.

In the integrator 30, when a high level signal (pulse signal) is output from the discriminator pulse generator 28, the capacitor C4 is charged by this signal through the resistor R11. Later, when the output from the discriminator pulse generator 28 goes low, the condenser C4 discharges its stored charge through the resistor R12. However since the resistor R12 in this embodiment has a resistance value many times greater than that of the resistor R11 (for instance, if R11 is 30 Ω then R12 could be 1 MΩ) the capacitor C4 will charge quickly due to the pulse signal rise time and then gradually discharge. Consequently, when repeatedly inputting a pulse signal from the discriminator pulse generator 28, the voltage across the terminals of the capacitor C4 will rise every time a pulse is input.

The start-up discriminator 32 is implemented as a comparator including an operational amplifier OP4 and voltage divider resistors R13 and R14 to apply a reference voltage $V_{TH2}$ drawn off from power supply voltage $V_{CC}$ to the non-inverting input terminal of the operational amplifier OP4. The output voltage from integrator 30 (in other words, the voltage at the terminals of capacitor C4) is applied to the non-inverting terminal of the operational amplifier OP4, and this voltage (or integrated value) is compared with the reference voltage $V_{TH2}$. So, a high level signal is output from the start-up discriminator 32 when the voltage from the integrator 30 exceeds the reference voltage $V_{TH2}$.

The output section 34 receiving the output signal from the start-up discriminator 32 comprises a diode D2 with its anode connected to the output terminal of the start-up discriminator 32 to prevent reverse current flow and a capacitor C5 provided between the ground line and cathode of the diode D2, and outputs a voltage at the terminal of the capacitor C5 as a drive signal $V_{WU}$ to drive the power supply switch 14.

In other words, the output section 34 is arranged so that when the output signal from the operational amplifier OP4 for the start-up discriminator 32 goes high, this output signal not only serves as a drive signal $V_{WU}$ for the power supply switch 14 but also charges the capacitor C5, so that even if the output from the operational amplifier OP4 goes low, the drive signal $V_{WU}$ will continue to be output for limited amount of time.

In this way, in the start discriminator 20 of this embodiment, when a vehicle approaches the entrance or exit of a toll road, or enters an area where communication is possible with the ground station, a pilot signal received at fixed intervals from the ground station by the antenna 10 is detected in the detector 22, and the received signal after detection undergoes inverted amplification by amplifier 24 in three stages, and as shown in FIG. 4B, the output signal from the amplifier 24 is repeatedly changed (10 times per 1 msec. interval in this embodiment) according to the pilot signal from the ground station.

From the level discriminator 26 a signal is output which becomes a high level signal when this output signal exceeds the reference voltage $V_{TH1}$, and from the discriminator pulse generator 28 a signal of a fixed pulse width is output which becomes a high level signal for a certain duration after the rise of the signal, and the voltage at the terminal of capacitor C4 increases in steps in response to the number of input pulses.

In this embodiment, the reference voltage $V_{TH2}$ is set to correspond to the integrator 30 output voltage when a specified number (five in the drawing) of pilot pulses are input into the integrator 30. As shown in FIG. 4D, the pulse signal of fixed pulse width from the discriminator pulse generator 28 to the integrator 30 synchronizes with the pilot signal transmission cycle from the ground station, and upon receiving five consecutive inputs, the start-up discriminator 32 discriminates to that effect and sets its output to a high level. A drive signal $V_{WU}$ is finally sent from the output section 34 which sets the power supply switch 14 on and the data transmit-receive section 16 and communication controller 18 are started.

The pilot signal is sent at fixed intervals from the ground station and after transmission of ten signals, the next signals are not sent for an interval of approximately 9 msec. In the integrator 30, the capacitor C4 afterwards releases its stored charge by way of the resistor R12, the output voltage from the integrator 30 is less than the reference voltage $V_{TH2}$, and the output signal from the start-up discriminator 32 goes from a high to a low level, but since the capacitor C5 provided in the output section 34 is charged up when the start-up discriminator 32 output signal level is high, the drive signal $V_{WU}$ will continue for a while due to the charge on the capacitor C5, even after the output signal from the start-up discriminator 32 falls from a high back to a low level.

In the start discriminator 20, the charge capacitance of the capacitor C5 is set so that when all of the ten pilot signals are received, power supply switch 14 will still be kept in the on state for a 100 msec. period from reception of the initial pilot signal.

Therefore, even if the output from the start discriminator 20 falls from a high to a low level due to termination of pilot signals from the ground station, the output level from the start-up discriminator 32 again goes high provided the vehicle does not leave the area where communication is possible with the ground station in the approximately 9 msec. period until the next pilot signals are sent from the ground station. The capacitor C5 charges up with start-up discriminator 32 at a high level, the start discriminator 20 continues to output a drive signal to keep the power supply switch 14 on, and the data transmit-receive section 16 and communication controller 18 continue to function from the time of entering the possible ground station communication area until leaving this area.

Once the vehicle leaves the communication area and the time required for the capacitor C5 to discharge its stored charge has elapsed, the power supply switch 14 is turned off and the data transmit-receive section 16 and the communication controller 18 stop functioning.

When the data transmit-receive section 16 and communication controller 18 are started by the start discriminator 20, communication controller 18 sends a self-identifying code from the data transmit-receive section 16 by way of the antenna 10 to the ground station and performs prescribed processing in response to commands transmitted from the ground station, such as a storage command for identifier codes showing names of toll road entrances and exits where the ground station is installed or a command to send that stored identifier code information to the ground station.

When external noise is input to the antenna 10, and to the receive signal input path from the antenna 10 to the start discriminator 20, the noise is detected as a receive signal at the detector 22, and the detected noise is amplified in the amplifier 24. Since this input noise may be large in comparison to the pilot signal received from the ground station, conventional methods relying only on the level of the amplified signal would mistakenly assume the communication area has been entered. However in the method of this embodiment, the pulse signal after level discrimination is converted into a pulse signal of fixed width by the discriminator pulse generator 28, and when generated as a pulse signal of consecutive specified quantity by the integrator 30 and the start-up discriminator 32, entry into the communications area is determined in a way preventing mistaken operation due to noise.

In other words, when noise is detected as a received signal in the detector 22, since the amplitude of the noise is larger than the level of the pilot signal, the internal circuits of the amplifier 24 will become saturated as shown in FIG. 5A and the amplifier 24 will output a signal with large positive and negative variations. Since a pulse signal is generated in the level discriminator 26 by comparing the sizes of the signal and the reference voltage $V_{TH}$, this widely varying signal and the reference voltage $V_{TH1}$ are compared and a pulse signal generated so that two wide pulse signals will be generated which have a wider pulse width than that when the normal pilot signal is received. In this embodiment, after the rise of the pulse signal that was generated, a high level pulse signal of a fixed pulse width is generated in the discriminator pulse generator 28 for a specified time only. Since this pulse signal of fixed pulse width is integrated in the integrator 30, the input signal level from the integrator 30 to the start-up discriminator 32 will not exceed the reference voltage $V_{TH2}$ no matter how large the output level from the amplifier 24. There is thus no possibility of the start-up discriminator 32 output going high due to noise, and unnecessary starting due to noise of the data transmit-receive section 16 and the communication controller 18 by a drive signal from the output section 34 is prevented.

Accordingly, this embodiment allows the start discriminator 20 of the transponder to accurately determine the entry of the vehicle (in other words, the transponder) into an area where communication with the ground station is possible without being influenced by noise, and to start-up the data transmit-receive section 16 and communication controller 18 while achieving an extremely favorable reduction in electrical power consumption by the transponder.

The ground station is informed of the approach of a vehicle equipped with a transponder by means of transmission of a self-identifying code from the communication controller 18 in the transponder to the ground station after start-up so that when the communication controller 18 is mistakenly started due to noise, an identifying code is sent to the transponder from the antenna 10, and the transmission of this self-identifying code by mistake causes potential mistaken operation of other transceivers. However there is no mistaken start-up of the communication controller 18 by noise in this embodiment so that the mistaken transmission of a self-identifying code can be prevented, and this in turn prevents the mistaken operation of other transceivers.

The transmission speed of the pilot signal in this embodiment is set to a low 10 kHz which is lower than the communication speed (100 kHz) during normal data transmission so that the throughput is lower in the internal circuitry of the start discriminator 20 than in other circuits used in normal data communication, thus allowing operational amplifiers of lower slew rates to be used in the construction so that the start discriminator 20 can be made at a comparatively low cost and electrical power consumption can be kept to a low level. The start discriminator 20 can easily be fabricated on one chip since it basically includes only an operational amplifier, comparator, diode and a more compact and lightweight transponder can be achieved.

The above embodiment explained an adaptation of this invention to collection systems for toll roads but can of course be used with any communication system involving a fixed transceiver, and a mobile unit such as are mounted in a vehicle or carried by a user. This invention can even be adopted, for instance, to communication systems for controlling automated conveyor cars in factories or in communication systems for connecting fixed land-based telephone networks with portable telephone equipment.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A control system for a mobile transceiver unit, said system comprising:

pulse signal generation means for receiving a signal representative of a signal from an external source and for generating a pulse signal responsive to said received signal;

an integrator integrating said pulse signal generated by said pulse signal generation means; and start-up discriminator means for comparing said integrated pulse signal with a first reference value and for activating a communication section of said mobile transceiver unit when a level of said integrated pulse signal reaches said first reference value.

2. The system of claim 1, said pulse signal generation means comprising:

level discriminator means for comparing said received signal with a second reference value and for generating a pulse signal when said level exceeds said second reference value; and discriminator pulse generator means for converting said pulse signal generated by said level discriminator generator means to a pulse signal having a constant pulse width.

3. The system of claim 2, said discriminator pulse generator means comprising:

an operational amplifier;

input resistors providing said pulse from said level discriminator means to non-inverting and inverting terminals of said operational amplifier;

a grounding resistor grounding said non-inverting terminal;

a resistor applying a fixed potential to said inverting terminal; and a capacitor having a first end connected to said inverting terminal and a second end connected to ground.

4. The system of claim 1 further comprising:

a detector detecting a signal from said external source and generating a detector signal representative thereof; and an amplifier receiving said detector signal and amplifying said detector signal to generate said signal representative of said signal from said external source.

5. The system of claim 4, wherein said amplifier inverts and amplifies components of said detector signal in approximately a 10 kHz frequency band.

6. The system of claim 1, said communication section including communication means for sending an identification code of said mobile transceiver unit to said external source after being activated by said start-up discriminator means and for performing prescribed communication operations responsive to a signal sent by said external transceiver.

7. The system of claim 1, wherein said mobile transceiver unit is a vehicle-mounted mobile transceiver unit.

8. The system of claim 1, said integrator comprising:

an input resistor having a first end connected to an output of said pulse signal generation means;

a diode having an anode connected to a second end of said input resistor to prevent reverse current flow to said pulse signal generation means;

a grounding resistor having a first end connected to a cathode of said diode; and a capacitor connected in parallel with said grounding resistor.

9. The system of claim 1, said start-up discriminator means comprising:

a voltage divider; and an operational amplifier having an inverting input connected to an output of said voltage divider and a non-inverting input connected to an output of said integrator to thereby function as a comparator.

10. The system of claim 9, said start-up discriminator means further comprising:

a diode having an anode connected to an output of said operational amplifier to prevent reverse current flow to said operational amplifier; and a capacitor having a first end connected to a cathode of said diode and a second end connected to ground.

11. The system of claim 1, wherein said start-up discriminator means is further for continuing to activate said communication section when said mobile transceiver unit is in an area where it can perform prescribed communication operations with said external source.

12. A method of controlling a mobile transceiver unit, said method comprising the steps of:

sending periodic signals from an interrogator;

receiving said periodic signals;

generating pulse signals responsive to said periodic signals;

integrating said pulse;

comparing said integrated pulse signals to a first reference value; and actuating a communication section of said mobile transceiver unit when a level of said integrated pulse signals exceeds said first reference value.

13. The method of claim 12, said receiving step comprising the steps of:

detecting said periodic signals; and amplifying said periodic signals.

14. The method of claim 13, said amplifying step comprising the step of amplifying components of said periodic signals in a predetermined frequency band.

15. The method of claim 12, said generating step comprising the steps of:

comparing said periodic signals to a second reference value; and generating a high level signal when a level of one of said periodic signals exceeds said second reference value.

16. The method of claim 12, said generating step comprising the step of generating a fixed width pulse signal responsive to one of said periodic signals.

17. The method of claim 12, further comprising the steps of:

sending an identification code of said mobile transceiver unit to said interrogator after said actuating step is performed;

performing prescribed communication operations responsive to a signal sent by said interrogator after said sending step.

\* \* \* \* \*